Oct. 3, 1933.    R. H. MADDOCK    1,928,942
CROSS FRAME MEMBER
Filed March 2, 1931    2 Sheets-Sheet 2
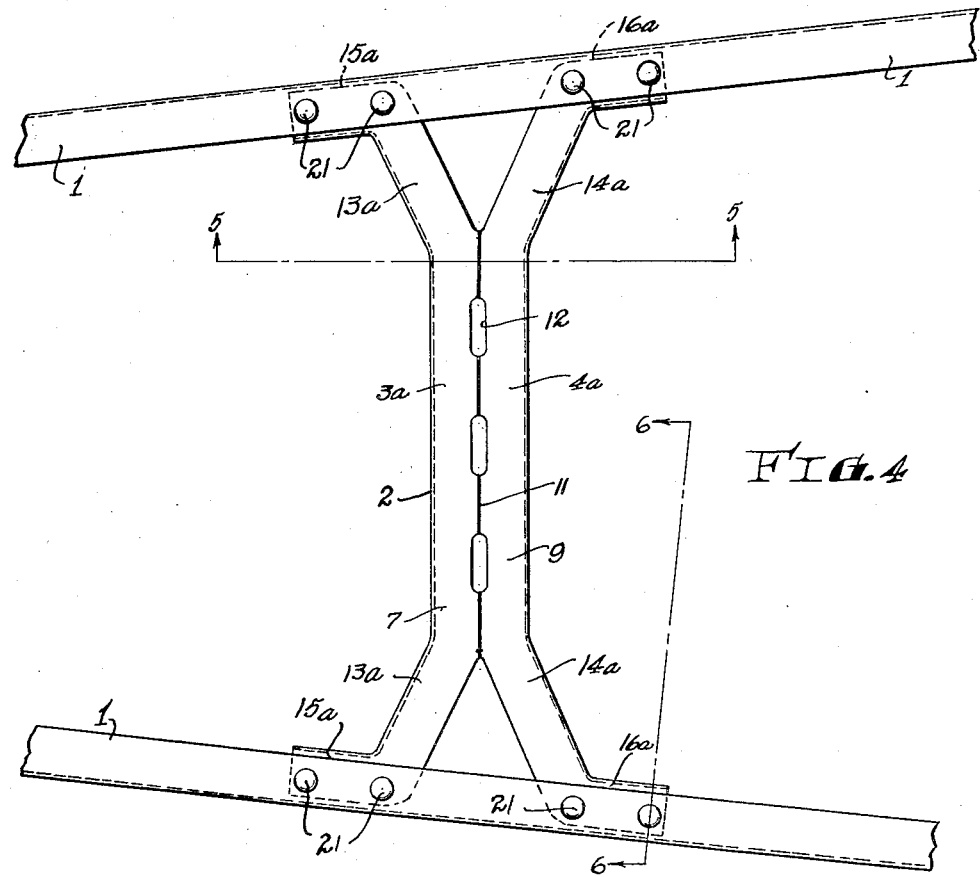
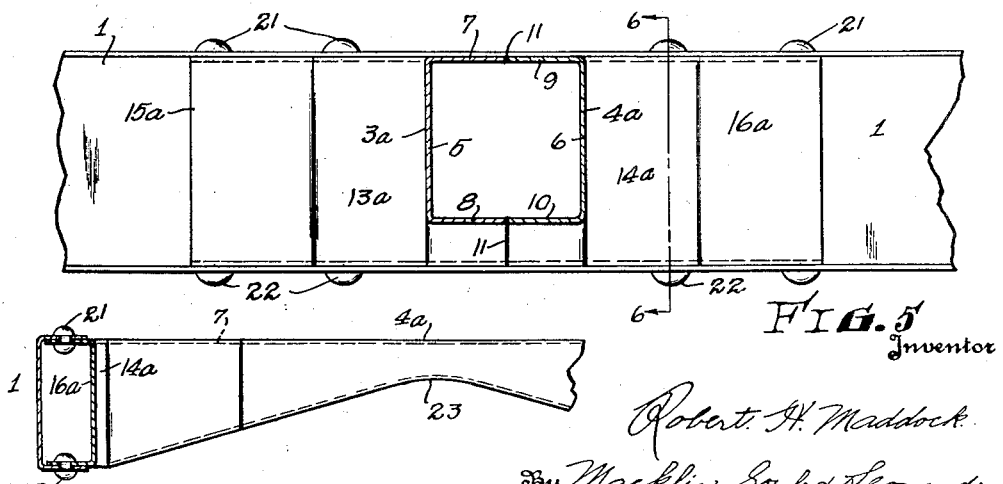

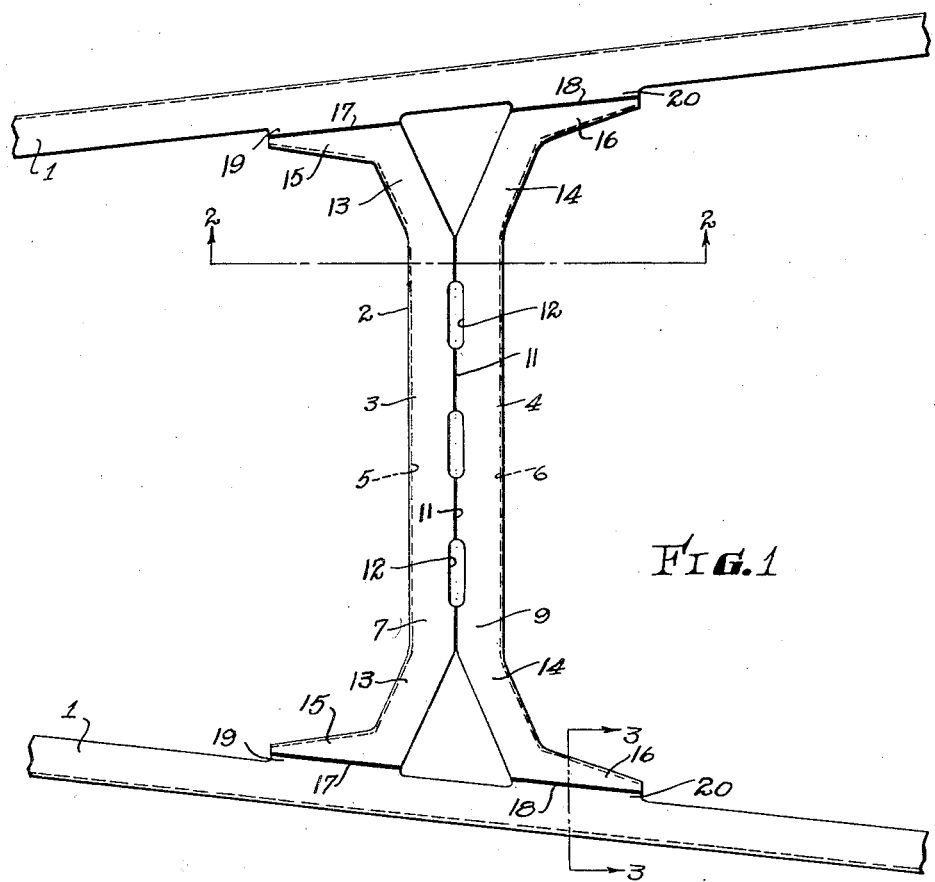
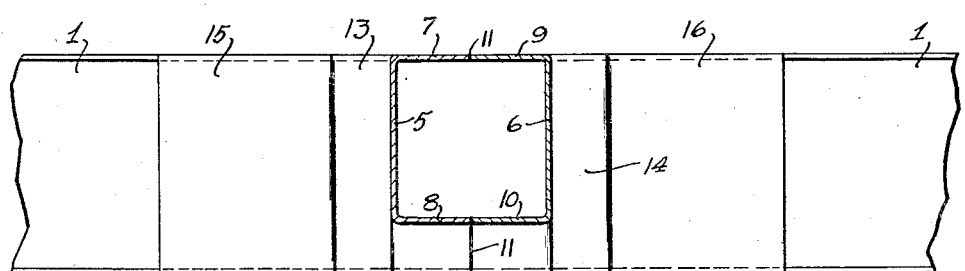
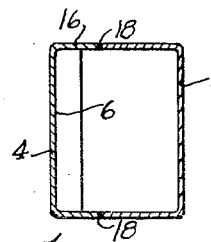

Patented Oct. 3, 1933

1,928,942

UNITED STATES PATENT OFFICE 1,928,942

CROSS FRAME MEMBER

Robert H. Maddock, Cleveland, Ohio, assignor to The Midland Steel Products Company, Cleveland, Ohio, a corporation of Ohio Application March 2, 1931. Serial No. 519,496

9 Claims. (Cl. 280—106)

This invention relates to automobile frames and particularly to a new and improved cross frame member secured to the vehicle frame in a novel manner.

The object of my invention is a cross member which most effectively utilizes the material and which may be easily formed and assembled and secured onto the frame.

Another object of my invention is a cross member which is capable of withstanding greater torsional and shearing stresses for a given amount of material than cross members heretofore produced.

In the accompanying drawings, are illustrated the forms of cross members and the manner in which they are secured to the frame.

In the drawings, Fig. 1 is a plan view of a portion of auto frame side rails with my improved cross member secured thereto.

Fig. 2 is a cross sectional view of the side rails and the cross member illustrated in Fig. 1, and is taken on a plane indicated by the line 2—2 of Fig. 1.

Fig. 3 is a partial cross sectional view of the side rail and cross member and is taken on a plane indicated by the line 3—3 of Fig. 1.

Fig. 4 illustrates a slightly modified form of a cross member secured to the side rails in a different manner.

Fig. 5 is a partial cross sectional view, taken on a plane indicated by the line 5—5 of Fig. 4; and Fig. 6 is a partial longitudinal view taken on a plane indicated by the line 6—6 of Figs. 4 and 5, part thereof being shown in section.

Referring more particularly to Figs. 1 and 2, the cross member is shown connected at its ends to the side rails 1 of the vehicle frame. The side rails are channel shaped in cross section preferably with inwardly disposed flanges. The cross member indicated generally as 2 is comprised of two channel shaped elements 3 and 4 extending transversely of the vehicle frame. These elements are disposed with their webs 5 and 6 respectively vertically of the frame with which associated, and with the flanges 7 and 8 of one disposed toward the corresponding flanges 9 and 10 respectively of the other. The elements 3 and 4 are preferably of such height that the upper flanges 7 and 9 thereof lie in the same plane and in the plane of the upper flanges of the side rail members, and the lower flanges 8 and 10 lie in the plane of the lower flanges of the side rail members.

The members 3 and 4 are secured together preferably by butt welding the flanges 7 and 8 of the one to the corresponding flanges 9 and 10 respectively of the other along the edges thereof. In most instances the flanges may be so welded only at separated portions, as indicated at 11. If desired, the flanges may be cut back slightly from the edges or notched at regularly recurring intervals, as indicated at 12, to facilitate welding the portions 11. In this manner a cross member of the box-like cross section, as better illustrated in Fig. 2, is formed. The notching of the flanges occurring at equally spaced intervals, provides the edges of the flanges with projecting portions between notches equal in length to the length of the notches in consequence of which the two channel elements 3 and 4 can be blanked out of the same strip of stock with a zigzag or staggered cut corresponding to the free edge of one flange for separating the two blanks, after which they can be moved relatively longitudinally to cause the projecting parts of one edge to abut the projecting parts of the other edge for butt-welding or riveting; thus creating a relatively large box section from a minimum amount of stock.

Beginning a short distance inwardly from each end of the member so formed, the flanges of the elements 3 and 4 are left unwelded, thus forming a vertical bifurcation. The resulting unwelded or bifurcated forks 13 and 14 of the elements 3 and 4 respectively, are bent outwardly from the plane of the cross member. The extreme outer ends 15 and 16 of the forks 13 and 14 respectively are further deflected in the same direction, so as to present the flanges thereof toward the flanges of the side rail members of the vehicle frame.

As above mentioned the elements 3 and 4 may be of a height such that the upper flanges and lower flanges thereof lie in the respective planes of the upper and lower flanges and side rail members. Thus both the upper and lower faces of the cross member and the corresponding faces of the side rails lie respectively in single planes. These flanges of the fork ends 15 and 16 are then butt welded to the corresponding flanges of the side rails along the lines indicated at 17 and 18 respectively.

Small fins, such as 19 and 20, may be provided on the upper and lower flanges of the side rails for securing the flanges of the cross member thereto.

In Figs. 4 to 6 inclusive is illustrated a cross member similarly formed, except for the fork ends, designated 15a and 16a, which correspond to the fork ends 15 and 16 of the member in Fig. 1

1. In this latter form, the channel shaped elements 3a and 4a are of such height that the flanges lie against the faces, preferably the inner faces, of the corresponding upper and lower flanges of the side rail members.

In such case, the forks 13a and 14a are of proper length so that the flanges on the fork ends 15a and 16a extend within the channel side rail and may be secured face to face with the flanges thereof by rivets, such as indicated at 21 and 22. The depth of the web of the channel elements 3a and 4a may be less at the center than at the ends, as indicated at 23 in Fig. 6, the depth gradually increasing outwardly. Such construction more easily accommodates the propeller shaft of the vehicle. The upper flange in such case is preferably straight, the entire difference in depth of web being utilized in positioning the lower web as high as possible.

From the foregoing description it is apparent that a cross member embodying these features, because of its box-like cross section, will withstand very severe shearing, torsional and other stresses. Likewise, since the ends are spread apart so as to engage the side rails at widely separated points, the side rail is not subjected to as severe stresses in the first instance and further greatly reinforces the frame. Again, the forks so formed are themselves flanged so that the possibility of buckling under stresses is greatly reduced. Several structural advantages are obtained likewise by such a member in that the upper and lower faces of the cross member may lie within the planes defined respectively by the upper flanges and lower flanges of the side rails.

As set forth in the objects the cross member described utilizes the entire stock and may be conveniently formed from strip bent first into channel shape without any waste whatsoever. Again, when prepared in the manner shown, the cross may be economically and quickly welded or otherwise secured together and to the frame, so that the member lends itself to economical quantity production and assemblage. It will be understood that some features of construction of cross members are applicable to other frame elements, such as the side rails, and consequently the claims specifying a cross member or member are to be so construed.

I claim:

1. A cross member for vehicle frames comprised of two channel shaped elements positioned each with their flanges toward the corresponding flanges of the other and secured together by welding the flanges of one to the corresponding flanges of the other intermediate the ends of the elements, the unwelded end portions of said elements being arranged in outwardly diverging relation to each other to form a substantially Y shaped structure at each end of the cross member.

2. In a vehicle frame including a pair of spaced channel side rails with upper and lower flanges, a cross member secured at each end to one of said side rails, said cross member comprising channel shaped elements extending transversely of the frame and having their flanges disposed toward each other, the upper and lower flanges of each of said elements being secured to the corresponding flanges of the other of said elements intermediate the ends of said elements, the unsecured end portions of said elements being bent outwardly of the cross member in outwardly diverging spaced relation, and said cross member being secured to the side rails by securing the flanges of the outwardly bent ends to the corresponding flanges of the side rails.

3. In a vehicle frame, a pair of spaced side rails having upper and lower flanges disposed inwardly of said frame, a cross member comprised of two channel shaped elements extending transversely of the frame and having their respective flanges toward the corresponding flanges of the other to form a box-section, said elements being secured together intermediate the ends, the unsecured ends being bent outwardly from the cross member and each end presenting a pair of outwardly diverging spaced apart arms arranged obliquely to the side rail with which the end is associated, and said flanges of said arms lying in the same plane as the corresponding side rail flanges and being butt welded to the side rail flanges.

4. In a vehicle frame, a pair of spaced side rails having upper and lower flanges disposed inwardly of said frame, a cross member comprised of two channel shaped elements extending transversely of the frame and having their respective flanges toward the corresponding flanges of the other and in abutting relation thereto to form a box section, said elements being secured together intermediate the ends, the unsecured ends being bent outwardly from the cross member and each end presenting a substantially Y shaped end with spaced apart outwardly diverging arms adapted to be secured to the flanges of the side rails.

5. In a vehicle frame two spaced side rails, and a cross member connecting said side rails, said cross member being of box cross section, the end portion of said member being bifurcated to form a substantially Y shaped fork at each end, each fork having a pair of spaced apart arms inclined toward the side rail with which the fork is associated for connecting the cross member thereto.

6. A member for vehicle frames, comprised of two channel shaped elements positioned with the flanges of one in abutting relationship with the corresponding flanges of the other and the webs disposed outwardly from the axis of the member so formed to form a box section, the flanges of each of said elements being provided with projections secured to corresponding projections of the other element at separated portions along the length thereof.

7. A cross member for vehicle frames having a box cross section, the end portions of said member being bifurcated in a vertical plane and the forks so formed being spread apart and deflected transversely to the axis of the member and connected to the side rails.

8. In a vehicle frame, a pair of spaced side rails having upper and lower flanges disposed inwardly of said frame, a cross member composed of two channel shaped elements extending transversely of the frame and having their respective flanges extending toward the corresponding flanges of the other and secured thereto to form a box section, said elements being secured together intermediate their ends, the unsecured ends being bent outwardly in substantially outwardly diverging relationship from the cross member, and the terminal of each channel element being bent outwardly to substantially parallel the adjacent side rail to present the flanges of the channel element to the corresponding flanges of the side rail with which the end is associated, and the flanges of said channel shaped elements being secured to corresponding flanges of the side rails.

9. A cross member for vehicle frames composed of two channel shaped elements positioned with the webs spaced apart and their flanges extending respectively toward each other, said respective flanges being secured together to form the cross member into tubular cross section, the flanges at the ends of said elements being unattached to one another, and the unattached adjacent ends of the elements being arranged in substantially outwardly diverging relation to each other to form a substantially Y-shaped structure at each end of the cross member.

ROBERT H. MADDOCK.